(12) United States Patent
Ishimura et al.

(10) Patent No.: US 10,994,766 B2
(45) Date of Patent: May 4, 2021

(54) STEERING SYSTEM

(71) Applicant: JTEKT CORPORATION, Osaka (JP)

(72) Inventors: Shoji Ishimura, Kashihara (JP); Hidenobu Tanaka, Shiki-gun (JP); Yuji Takahashi, Obu (JP)

(73) Assignee: JTEKT CORPORATION, Osaka (JP)

( * ) Notice: Subject to any disclaimer, the term of this patent is extended or adjusted under 35 U.S.C. 154(b) by 104 days.

(21) Appl. No.: 16/250,311

(22) Filed: Jan. 17, 2019

(65) Prior Publication Data
US 2019/0225254 A1 Jul. 25, 2019

(30) Foreign Application Priority Data

Jan. 25, 2018 (JP) .............................. JP2018-010587

(51) Int. Cl.
| | |
|---|---|
| *B62D 1/19* | (2006.01) |
| *B62D 1/185* | (2006.01) |
| *B62D 1/181* | (2006.01) |
| *F16H 25/20* | (2006.01) |

(52) U.S. Cl.
CPC .............. *B62D 1/192* (2013.01); *B62D 1/181* (2013.01); *B62D 1/185* (2013.01); *F16H 25/20* (2013.01); *F16H 2025/2075* (2013.01)

(58) Field of Classification Search
CPC .......... B62D 1/185; B62D 1/19; B62D 1/192; B62D 1/195
See application file for complete search history.

(56) References Cited

U.S. PATENT DOCUMENTS

| | | | | |
|---|---|---|---|---|
| 7,410,190 B2* | 8/2008 | Sawada | ..................... | B62D 1/19 180/427 |
| 8,650,982 B2* | 2/2014 | Matsuno | ................ | B62D 1/181 74/492 |
| 8,650,983 B2* | 2/2014 | Mizuno | .................. | B62D 1/181 74/496 |
| 8,882,146 B2* | 11/2014 | Shibazaki | ................ | B62D 1/16 280/775 |
| 10,385,930 B2* | 8/2019 | Magnus | .................. | F16D 15/00 |

(Continued)

FOREIGN PATENT DOCUMENTS

| | | |
|---|---|---|
| JP | 2003-276616 A | 10/2003 |
| JP | 2005-59668 A | 3/2005 |

OTHER PUBLICATIONS

Jun. 24, 2019 Extended Search Report issued in European Application No. 19153452.8.

*Primary Examiner* — Barry Gooden, Jr.
(74) *Attorney, Agent, or Firm* — Oliff PLC

(57) ABSTRACT

A steering system that is telescopically extendable and retractable using a motor driving force includes a motor, a telescopic steering shaft, a tube that supports the steering shaft such that the steering shaft is rotatable and that is movable with telescopic movement of the steering shaft, and a driving force transmission device that transmits a rotational driving force of the motor to the tube. The driving force transmission device includes a driving force converter that converts the rotational driving force of the motor to a linear driving force, and a coupling member that couples the driving force converter to the tube. The coupling member is breakable by an impact force applied thereto through the steering shaft and the supporting member during a secondary collision so as to decouple the driving force converter from the tube.

13 Claims, 7 Drawing Sheets

(56) References Cited

U.S. PATENT DOCUMENTS

| | | |
|---|---|---|
| 2006/0181070 A1 | 8/2006 | Imamura et al. |
| 2006/0191368 A1 | 8/2006 | Sawada et al. |
| 2009/0256341 A1* | 10/2009 | Okada .................... B62D 1/181 |
| | | 280/775 |
| 2015/0090520 A1* | 4/2015 | Shibazaki ............ B62D 5/0406 |
| | | 180/446 |
| 2015/0232117 A1 | 8/2015 | Stinebring et al. |
| 2019/0225255 A1* | 7/2019 | Ishimura ................ B62D 1/181 |
| 2019/0283793 A1* | 9/2019 | Matsuno ................ B62D 1/192 |
| 2020/0207401 A1* | 7/2020 | Martinez ................ B62D 1/181 |
| 2020/0317251 A1* | 10/2020 | Munding ............... B62D 1/192 |

* cited by examiner

STEERING SYSTEM

INCORPORATION BY REFERENCE

The disclosure of Japanese Patent Application No. 2018-010587 filed on Jan. 25, 2018 including the specification, drawings and abstract, is incorporated herein by reference in its entirety.

BACKGROUND OF THE INVENTION

1. Field of the Invention

The invention relates to a steering control apparatus.

2. Description of Related Art

A vehicle collision may cause a secondary collision between a driver and a steering wheel. Steering systems are required to have a mechanism for absorbing an impact exerted by a steering wheel on a driver during a secondary collision. Japanese Patent Application Publication No. 2005-59668 (JP 2005-59668 A) discloses an impact absorbing device for absorbing impact energy during a secondary collision. The impact absorbing device is used for a telescopic steering system that allows adjustment of the distance between a driver and a steering wheel. The impact absorbing device is mounted between a vehicle body and a tube. A steering shaft is inserted through the tube providing a telescopically movable portion of a steering column. Specifically, the impact absorbing device is interposed between a supported member that supports and fixes the tube, and a mount portion of a reinforcement of the vehicle body. When the steering column is impacted in the event of a secondary collision, a mount pin that fixes the supported member to the mount portion of the reinforcement is broken. As a result, the tube moves along with the supported member toward the front of a vehicle.

These days there are telescopic steering systems that are driven by a driving force of motors. In such a motor-driven telescopic steering system, a tube is mechanically connected to a motor and thus movable. That is, unlike in JP 2005-59668 A, the tube is not fixed to a supported member. In order to use the impact absorbing device disclosed in JP 2005-59668 A for a motor-driven telescopic steering system, it is necessary to transmit an impact on a steering column to a support member and to move a tube along with the supported member. A structure for achieving these may be complicated. The complicated structure may increase the cost and size of a steering system.

SUMMARY OF THE INVENTION

A purpose of the invention is to provide a motor-driven steering system having a simple structure for absorbing an impact in the event of a vehicle collision.

An aspect of the invention provides a steering system that is telescopically extendable and retractable using a motor driving force. The steering system includes: a motor; a telescopic steering shaft; a supporting member that supports the steering shaft such that the steering shaft is rotatable and that is movable with telescopic movement of the steering shaft; and a driving force transmission device that transmits a rotational driving force of the motor to the supporting member. The driving force transmission device includes a driving force converter that converts the rotational driving force of the motor to a linear driving force, and a coupling member that couples the driving force converter to one of the motor and the supporting member. The coupling member is breakable by an impact force applied to the coupling member through the steering shaft and the supporting member during a secondary collision so as to decouple the driving force converter from the one of the motor and the supporting member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering system according to embodiments is described below with reference to the drawings. The embodiments illustrate general or specific examples. Numerical values, shapes, materials, structural elements, arrangement and connection of the structural elements, steps, the processing order of the steps, etc. described in the embodiments are merely examples and are not intended to limit the invention. Out of the structural elements described in the embodiments, structural elements that are not recited in an independent claim most broadly defining the inventive concept of the invention are optional, nonessential elements. A term "substantially" may be used in conjunction with another term, such as "substantially parallel" or "substantially perpendicular", to describe the embodiments. The term "substantially" includes exactly a term it modifies and slight variations therefrom. Thus, for example, the term "substantially parallel" means exactly parallel and slight variations of, for example, a few percent to less than twenty percent. The same is true for other expressions using the term "substantially". The drawings are schematic, not necessarily to scale. In addition, substantially identical structural elements are given the same numerals throughout the drawings, and their description may be simplified or omitted to avoid redundancy.

A steering system 100 according to a first embodiment is described. According to the first embodiment, the steering system 100 is adapted to be mounted on a vehicle, such as an automobile. The steering system 100 is an electric telescopic steering system. That is, the steering system 100 is telescopically extendable and retractable using a motor driving force to allow adjustment of the distance between a driver and a steering wheel 2.

Figure 1:
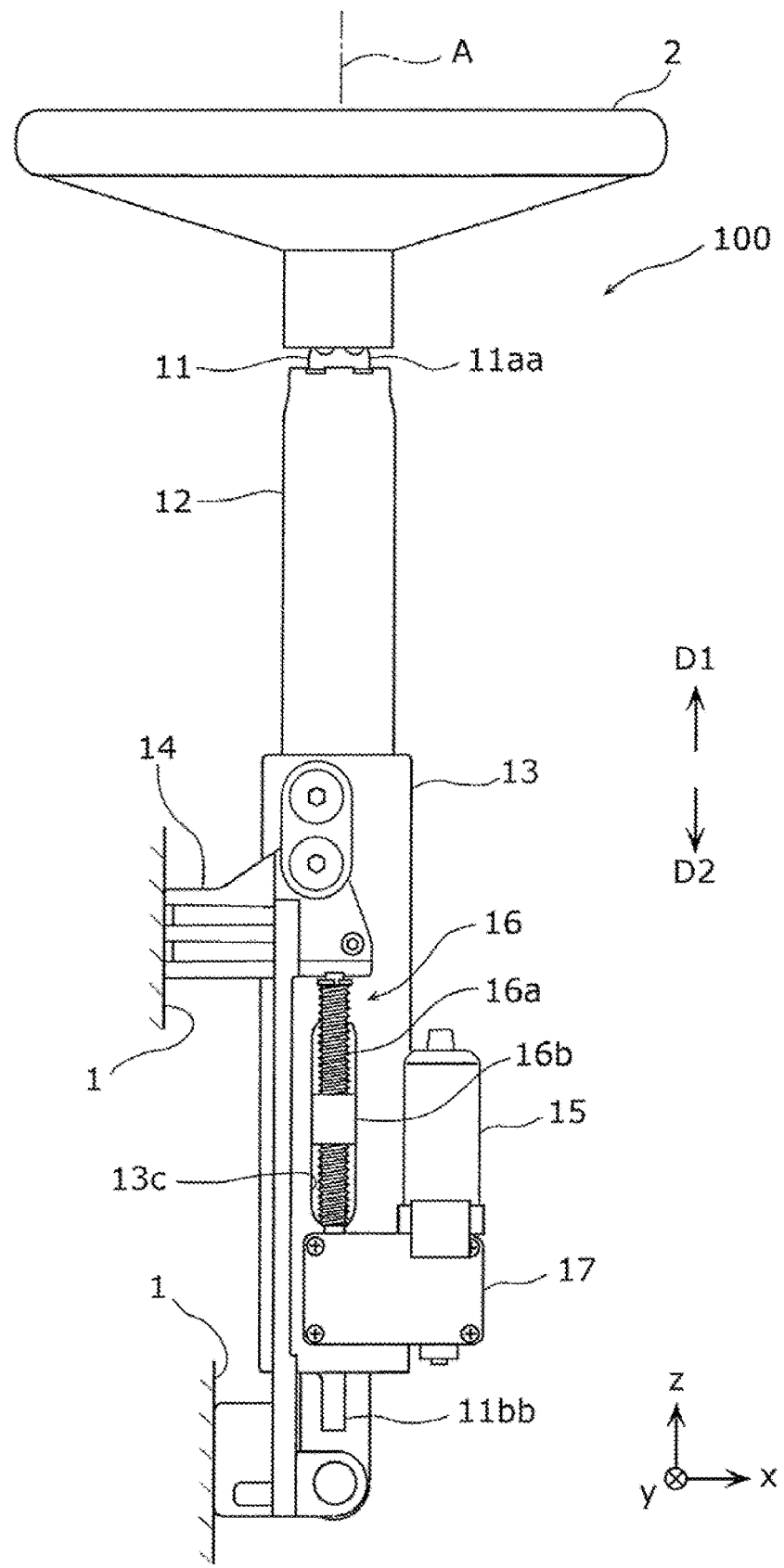
FIG. 1 is a schematic external side view of a steering system according to a first embodiment.

FIG. 1 is a schematic external side view of the steering system 100 according to the first embodiment. The steering system 100 includes a steering shaft 11, a tube 12, a housing 13, and a mount base 14. The tube 12 supports the steering shaft 11 such that the steering shaft 11 is rotatable. The housing 13 supports the tube 12 such that the tube 12 is slidably movable in axial directions along an axis A of the steering shaft 11. The mount base 14 fixes the housing 13 to a mount portion 1 of a vehicle body. The steering system 100 further includes a motor 15, a driving force transmission device 16, and a speed reducer 17. The motor 15 moves the tube 12 in the axial directions. The driving force transmission device 16 converts a rotational driving force of the motor 15 to a linear driving force in the axial directions. The speed reducer 17 reduces the speed of the rotational driving force of the motor 15 and then transmits the rotational driving force to the driving force transmission device 16.

A first end 11*aa* of the steering shaft 11 is coupled to the steering wheel 2. A second end 11*bb* of the steering shaft 11 is coupled to a steering mechanism. The steering shaft 11 transmits rotation of the steering wheel 2 to the steering mechanism and is made of a material with torsional stiffness and strength. For example, the steering shaft 11 is made of metal, such as iron. The steering shaft 11 is inserted through the tube 12.

The tube 12 has a cylindrical shape and extends in the axial directions to encompass the outer circumference of the steering shaft 11. The tube 12 supports the steering shaft 11 such that the steering shaft 11 is rotatable about the axis A. The steering shaft 11 is immovable relative to the tube 12 in the axial directions. Thus, the tube 12 is movable along with the steering shaft 11 in the axial directions. The tube 12, which supports the steering shaft 11, is made of a material with stiffness and strength. For example, the tube 12 is made of metal, such as iron. According to the first embodiment, the steering shaft 11 and the tube 12 are concentrically arranged relative to each other about the axis A. Alternatively, the axis of the tube 12 may be displaced from the axis A of the steering shaft 11. The tube 12 is not limited to a cylindrical shape and may have any shape that supports the steering shaft 11 such that the steering shaft 11 is rotatable about the axis A. The steering shaft 11 only needs to be movable or immovable relative to the tube 12 in the axial directions. The tube 12 is an example of a supporting member.

The axial directions along the axis A are defined as z-axis directions. Of the z-axis directions, one direction that is from the second end 11*bb* to the first end 11*aa* is defined as a positive z-axis direction, and the opposite direction that is from the first end 11*aa* to the second end 11*bb* is defined as a negative z-axis direction. As described later, the steering shaft 11 is telescopically extendable and retractable in the z-axis directions. Directions that are perpendicular to the z-axis directions and that are from one of the steering shaft 11 and the mount portion 1 to the other of the steering shaft 11 and the mount portion 1 are defined as x-axis directions. Of the x-axis directions, one direction that is from the mount portion 1 to the steering shaft 11 is defined as a positive x-axis direction, and the opposite direction that is from the steering shaft 11 to the mount portion 1 is defined as a negative x-axis direction. Directions that are perpendicular to both the x-axis directions and the z-axis directions are defined as y-axis directions. Of the y-axis directions, one direction that is from the front to the back of the sheet having FIG. 1 is defined as a positive y-axis direction, and the opposite direction that is from the back to the front of the sheet having FIG. 1 is defined as a negative y-axis direction.

Figure 2:
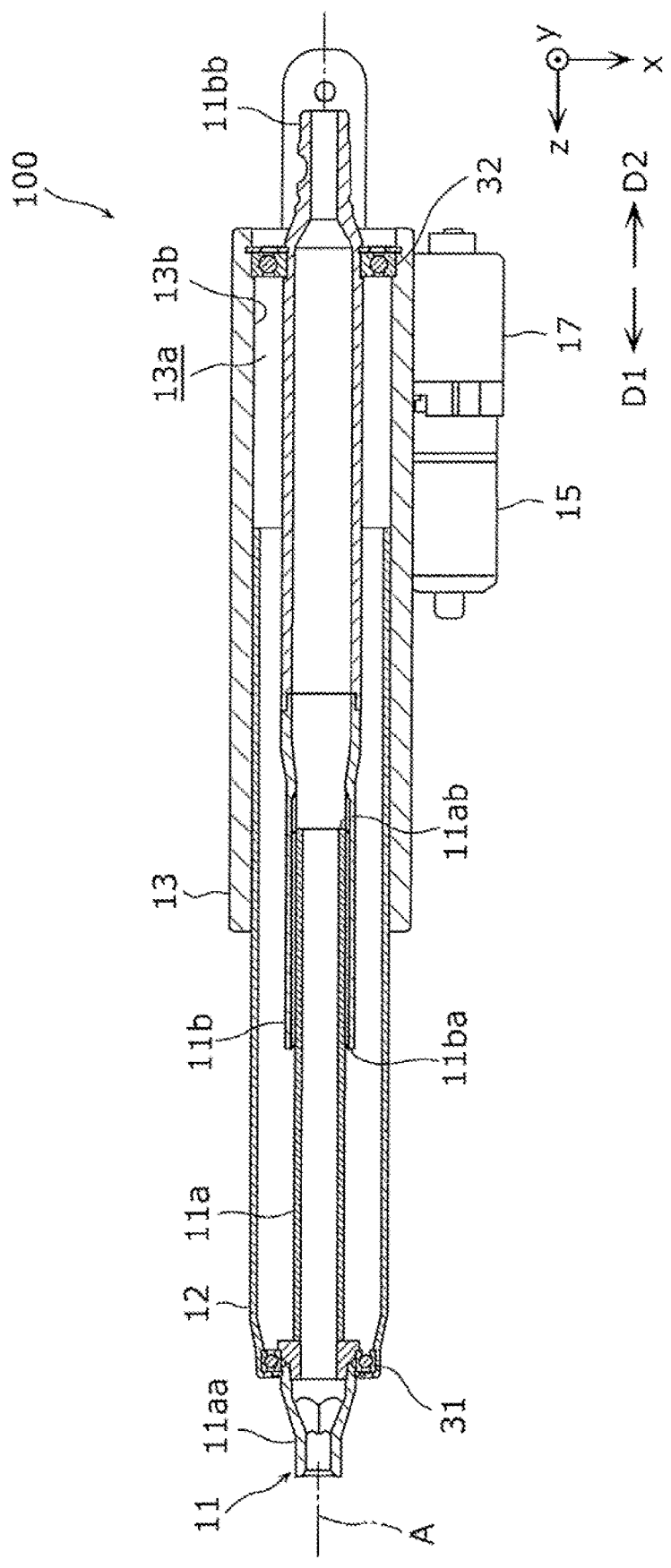
FIG. 2 is a schematic side cross-sectional view of the steering system in FIG. 1, taken along a first plane passing through an axis of a steering shaft.
Figure 3:
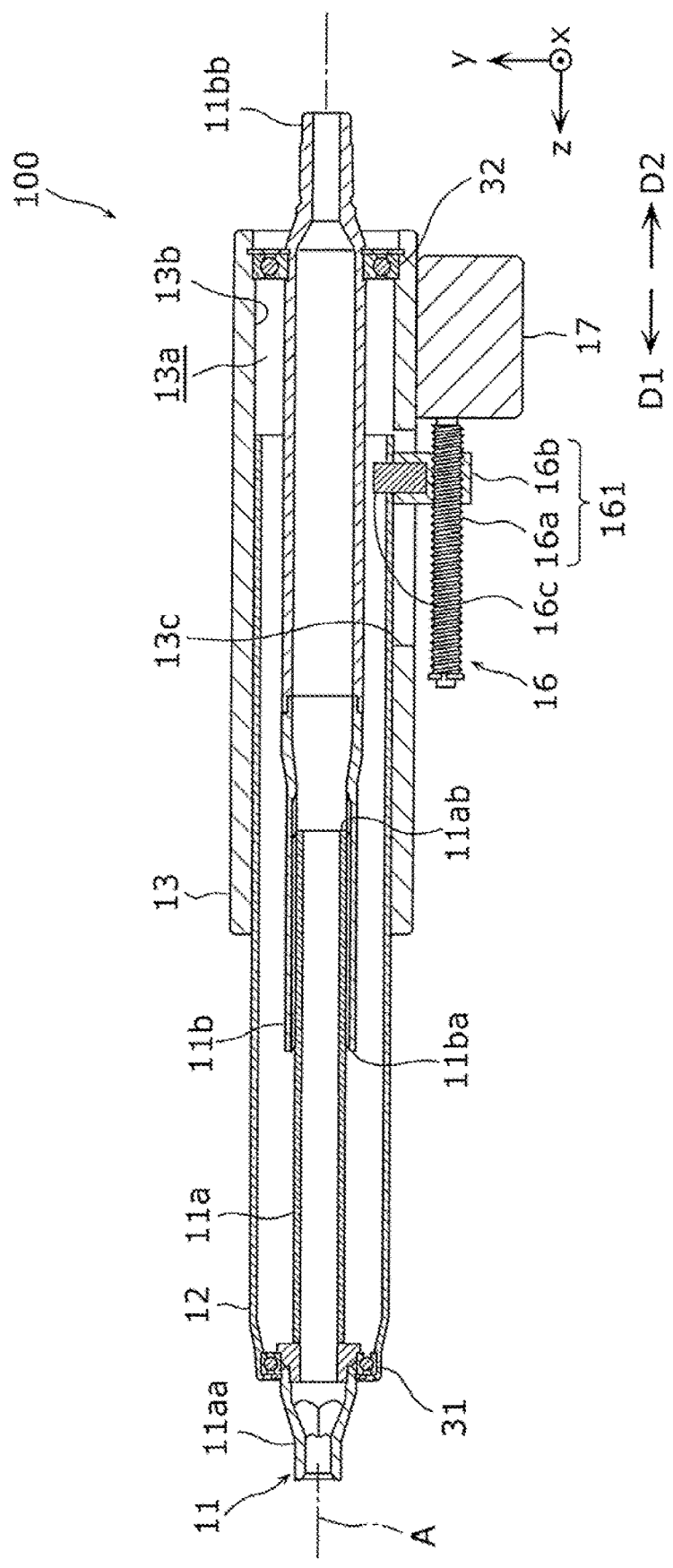
FIG. 3 is a schematic side cross-sectional view of the steering system in FIG. 1, taken along a second plane, different from the first plane, passing through the axis of the steering shaft.

FIG. 2 is a schematic side cross-sectional view of the steering system 100 in FIG. 1, taken along a first plane passing through the axis A of the steering shaft 11. Specifically, FIG. 2 illustrates a cross section of the steering system 100 in FIG. 1, when viewed in the negative y-axis direction, taken along the first plane that passes through the axis A and that is parallel to a xz-plane defined by the x-axis directions and the z-axis directions. For the sake of simplicity, the illustration of FIG. 2 omits the mount base 14. FIG. 3 is a schematic side cross-sectional view of the steering system 100 in FIG. 1, taken along a second plane, different from the first plane, passing through the axis A of the steering shaft 11. Specifically, FIG. 3 illustrates a cross section of the steering system 100 in FIG. 1, when viewed in the negative x-axis direction, taken along the second plane that passes through the axis A and that is parallel to a yz-plane defined by the y-axis directions and the z-axis directions. For the sake of simplicity, the illustration of FIG. 3 omits the mount base 14.

As illustrated in FIGS. 1 to 3, the steering shaft 11 includes a cylindrical upper shaft 11*a* and a cylindrical lower shaft 11*b*. A first end of the upper shaft 11*a* forms the first end 11*aa* of the steering shaft 11. A second end 11*ab* of the upper shaft 11*a* is inserted in a first end 11*ba* of the lower shaft 11*b*. A second end of the lower shaft 11*b* forms the second end 11*bb* of the steering shaft 11. The second end 11*ab* has a splined outer circumferential surface. The first end 11*ba* has a splined inner circumferential surface. The upper shaft 11*a* and the lower shaft 11*b* are splined together. Thus, the upper shaft 11*a* is not rotatable relative to the lower shaft 11*b* about the axis A, but is slidably movable relative to the lower shaft 11*b* in the axial directions. Alternatively, the first end 11*ba* may be inserted in the second end 11*ab*.

A bearing 31 is mounted on an inner circumferential surface of the tube 12 at a position near the first end 11*aa*. The tube 12 supports the upper shaft 11*a* through the bearing 31 so that the upper shaft 11*a* is rotatable about the axis A. The bearing 31 fixes the upper shaft 11*a* so that the upper shaft 11*a* is immovable relative to the tube 12 in the axial directions. A bearing 32 is mounted on an inner circumferential surface 13*b* of the housing 13 at a position near the second end 11*bb*. The housing 13 supports the lower shaft 11*b* through the bearing 32 so that the lower shaft 11*b* is rotatable about the axis A. The bearing 32 fixes the lower shaft 11*b* so that the lower shaft 11*b* is immovable relative to the housing 13 in the axial directions. The bearings 31 and 32 may be, for example, rolling bearings.

The upper shaft 11*a* and the lower shaft 11*b* are rotatable together, as a unit, about the axis A relative to the tube 12 and the housing 13. The upper shaft 11*a* is slidable together with the tube 12, as a unit, relative to the lower shaft 11*b* and the housing 13 in the axial directions. Thus, the steering shaft 11 is telescopically extendable and retractable. The tube 12 moves with the telescopic movement of the steering shaft 11, specifically, the telescopic movement of the upper shaft 11*a*.

The mount base 14 is fixed to the mount portion 1 that is located in the negative x-axis direction crossing the axis A. Thus, the mount base 14 fixes the housing 13 to the mount portion 1. The mount base 14 is made of a material with stiffness and strength. For example, the mount base 14 is made of metal, such as iron or aluminum alloy, or hard resin. According to the first embodiment, the mount base 14 has a frame shape to reduce its size and weight. The housing 13 has a tubular shape, and the inner circumferential surface 13b of the housing 13 has a cylindrical shape. The housing 13 has an inside space 13a defined by the inner circumferential surface 13b. The steering shaft 11 and the tube 12 are held in the inside space 13a. The inside space 13a is open in the positive z-axis direction and in the negative z-axis direction. The housing 13 supports the tube 12 such that the tube 12 is slidably movable on the inner circumferential surface 13b in the axial directions, and supports the steering shaft 11 through the bearing 32 so that the steering shaft 11 is rotatable. The housing 13 supports the steering shaft 11 from the side, with respect to the axis A, through the tube 12. Specifically, the steering shaft 11 passes through the inside space 13a and protrudes outside the housing 13 through the two openings in the housing 13. The tube 12 extends from the inside space 13a to the outside of the housing 13 through one of the two openings that is located closer to the first end 11aa of the steering shaft 11 than the other opening. The housing 13 is made of a material with stiffness and strength. For example, the housing 13 is made of metal, such as aluminum alloy, or hard resin.

The motor 15 and the speed reducer 17 are fixed to the outer side of the housing 13. A threaded shaft 16a of the driving force transmission device 16 extends from the speed reducer 17. The threaded shaft 16a is a straight rod-shaped member and has an outer circumferential surface provided with an external thread. The threaded shaft 16a is fixed and immovable relative to the housing 13 in the x-axis, y-axis, and x-axis directions. A rotating shaft (not shown) of the motor 15 and the threaded shaft 16a are arranged parallel to each other and extend from the speed reducer 17 in the same direction, specifically, in the positive z-axis direction. Thus, the speed reducer 17, the motor 15, and the threaded shaft 16a are structured to occupy less space. The speed reducer 17 includes the following: a first gear that rotates as a unit with the rotating shaft of the motor 15; a second gear that is located at one end of the threaded shaft 16a and that rotates as a unit with the threaded shaft 16a; and a third gear that meshes with the first gear and the second gear. The speed reducer 17 transmits the rotational driving force of the motor 15 to the threaded shaft 16a, while amplifying the rotational driving force and reducing the speed of the rotational driving force. The rotational driving force transmitted through the speed reducer 17 rotates the threaded shaft 16a in directions about an axis of the thread. As the rotational direction of the motor 15 changes, the rotational direction of the threaded shaft 16a changes correspondingly. According to the first embodiment, the motor 15 is an electric motor. Alternatively, the motor 15 may be any other type of motor, such as a hydraulic motor. The threaded shaft 16a is an example of a first member.

Figure 4:
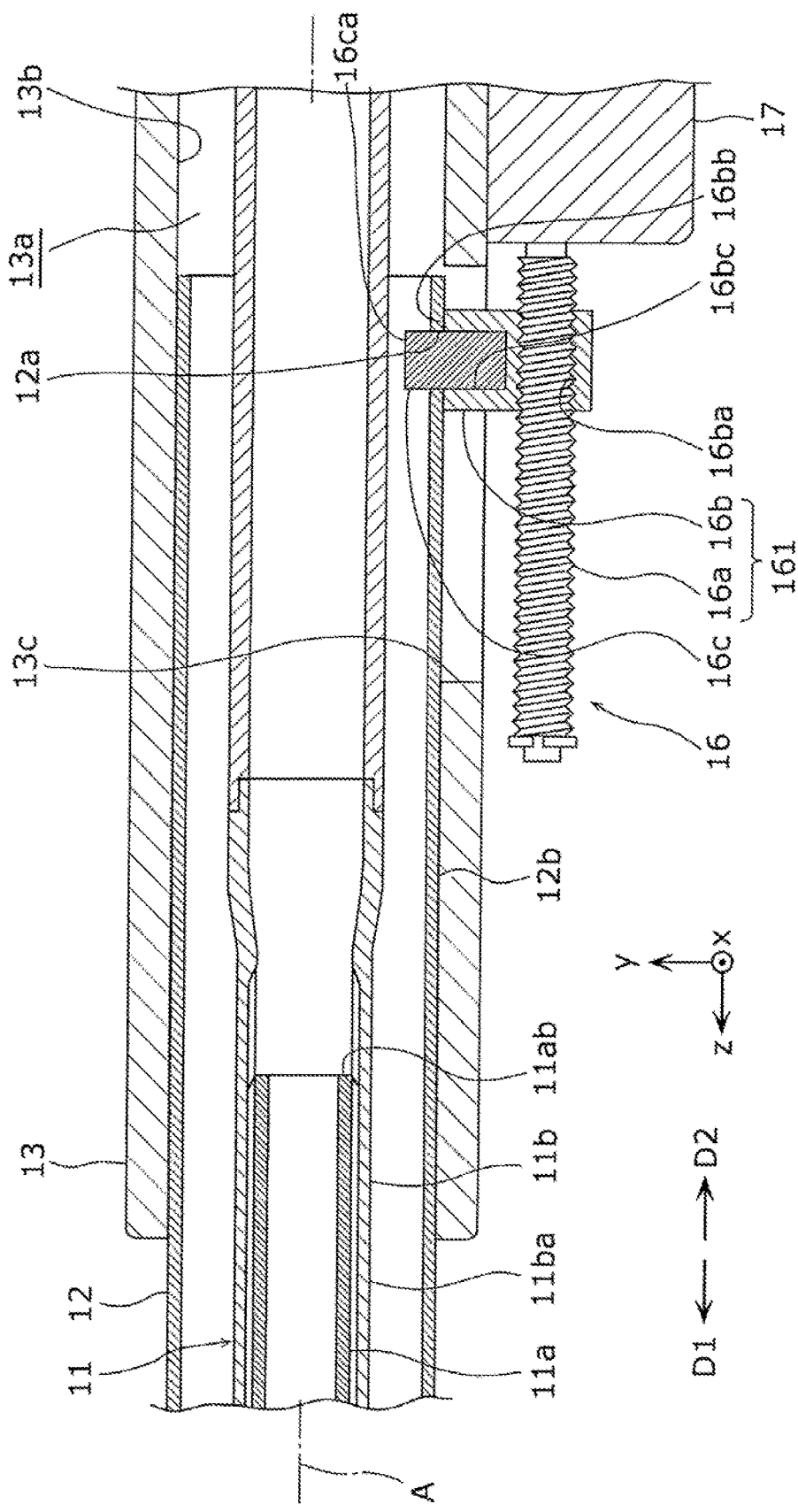
FIG. 4 is a schematic partial enlarged view of FIG. 3 and illustrates details of a driving force transmission device.

As illustrated in FIG. 4, the driving force transmission device 16 includes a screw-hole member 16b and a coupling member 16c, in addition to the threaded shaft 16a. FIG. 4 is a partial enlarged view of FIG. 3 and illustrates details of the driving force transmission device 16. The screw-hole member 16b has an internally threaded hole 16ba that threadedly engages with the external thread of the threaded shaft 16a and that goes through the screw-hole member 16b. The rotation of the threaded shaft 16a causes the screw-hole member 16b threadedly engaging with the threaded shaft 16a to move linearly on the threaded shaft 16a in the axial directions, for example, in the z-axis directions. The screw-hole member 16b reciprocates on the threaded shaft 16a in accordance with the rotational direction of the threaded shaft 16a. The threaded shaft 16a and the screw-hole member 16b form a driving force converter 161 that converts the rotational driving force of the motor 15 to a linear driving force that linearly moves the screw-hole member 16b. The threaded shaft 16a and the screw-hole member 16b are made of any suitable material. According to the first embodiment, the threaded shaft 16a is made of a material with stiffness and strength. For example, the threaded shaft 16a is made of metal, such as iron. On the other hand, the screw-hole member 16b is made of metal, such as iron or aluminum alloy, or resin. The screw-hole member 16b is an example of a second member.

The coupling member 16c passes through a through hole 13c formed in a peripheral wall of the housing 13 and couples together the screw-hole member 16b and the tube 12. The through hole 13c extends from the inner circumferential surface 13b of the housing 13 to the outside of the housing 13. The through hole 13c has an elongated shape with its longitudinal directions extending along the axial directions. The through hole 13c is formed over an area where the screw-hole member 16b is movable.

The screw-hole member 16b has a surface 16bb that faces an outer circumferential surface 12b of the tube 12 through the through hole 13c. The surface 16bb has a tubular recess 16bc. The recess 16bc is recessed from the surface 16bb in a direction away from the outer circumferential surface 12b, i.e., in a radially outward direction of the tube 12. The direction in which the recess 16bc is recessed crosses the axis of the internally threaded hole 16ba. According to the first embodiment, the direction in which the recess 16bc is recessed perpendicularly crosses the axis of the internally threaded hole 16ba. In other words, the recess 16bc is recessed in the radial direction of the internally threaded hole 16ba. The recess 16bc is located between the internally threaded hole 16ba and the surface 16bb, i.e., between the internally threaded hole 16ba and the outer circumferential surface 12b.

The coupling member 16c has a columnar shape and is inserted and fitted in the recess 16bc. A tip portion 16ca of the coupling member 16c in the recess 16bc projects from the surface 16bb. The projecting tip portion 16ca of the coupling member 16c is inserted and fitted in an engagement hole 12a formed in the outer circumferential surface 12b of the tube 12. According to the first embodiment, the engagement hole 12a is a through hole that penetrates a cylindrical wall of the tube 12. Alternatively, the engagement hole 12a may be a blind hole that does not penetrate the cylindrical wall of the tube 12. To reduce backlash between the screw-hole member 16b and the coupling member 16c, it is preferable that the recess 16bc and the coupling member 16c be tightly fitted together. To reduce backlash between the tube 12 and the coupling member 16c, it is preferable that the engagement hole 12a and the coupling member 16c be tightly fitted together. The recess 16bc and the coupling member 16c may have a circular shape in cross section perpendicular to their axis, and the engagement hole 12a may have a corresponding circular shape. Alternatively, the shape of the engagement hole 12a and the cross-sectional shape of the recess 16bc and the coupling member 16c may be other than circular. The alternative effectively reduces the occurrence of relative rotation between the tube 12, the coupling member 16c, and the screw-hole member 16b.

The coupling member 16c is made of a material having less strength than those of the tube 12 and the screw-hole member 16b. For example, the coupling member 16c is made from resin. The resin for the coupling member 16c may be, but not limited to, hard resin. According to the first embodiment, the coupling member 16c is made from resin and is integrally formed with the screw-hole member 16b by a resin molding method, such as insert molding or outsert molding. Thus, the coupling member 16c is integral with the screw-hole member 16b and serves as part of the screw-hole member 16b. According to the first embodiment, the coupling member 16c has a solid shape. Alternatively, the coupling member 16c may have a hollow shape.

The coupling member 16c couples the driving force converter 161, specifically, the screw-hole member 16b, to the tube 12 so as to transmit the linear driving force of the screw-hole member 16b to the tube 12. Thus, the coupling member 16c allows the screw-hole member 16b and the tube 12 to move together as a unit. The surface 16bb of the screw-hole member 16b either has contact with or has no contact with the outer circumferential surface 12b of the tube 12. When the surface 16bb has contact with the outer circumferential surface 12b of the tube 12, the surface 16bb may be curved to follow the outer circumferential surface 12b. With such a curved surface 16bb, the screw-hole member 16b reinforces the bending strength of the coupling member 16c.

Since the coupling member 16c is inserted in the recess 16bc and passes through the engagement hole 12a, the strength by which the coupling member 16c is fitted to the screw-hole member 16b and the tube 12 is improved. The improved fitting strength of the coupling member 16c allows a reduction in the size of the screw-hole member 16b. Specifically, this allows a reduction in the distance between the internally threaded hole 16ba of the screw-hole member 16b and the outer circumferential surface 12b of the tube 12. That is, this allows the threaded shaft 16a to be located close to the housing 13. Thus, this allows the driving force transmission device 16 to have a smaller size in the radial direction of the housing 13.

According to the structure described above, when the motor 15 is driven to rotate such that the threaded shaft 16a rotates in a first direction, the screw-hole member 16b moves linearly in the positive z-axis direction, i.e., in an extension direction D1 to extend the steering shaft 11. At the same time, the screw-hole member 16b moves the coupling member 16c and the tube 12 together with the screw-hole member 16b in the extension direction D1. This causes the tube 12 to move together with the upper shaft 11a of the steering shaft 11 in the extension direction D1, thereby extending the steering shaft 11.

On the other hand, when the motor 15 is driven to rotate such that the threaded shaft 16a rotates in a second direction opposite to the first direction, the screw-hole member 16b moves in the negative z-axis direction, i.e., in a retraction direction D2 to retract the steering shaft 11. At the same time, the screw-hole member 16b moves the coupling member 16c and the tube 12 together with the screw-hole member 16b in the retraction direction D2. This causes the tube 12 to move together with the upper shaft 11a of the steering shaft 11 in the retraction direction D2, thereby retracting the steering shaft 11.

To cause the tube 12 to move synchronously with the movement of the screw-hole member 16b, the coupling member 16c has a stiffness that moves the tube 12 by transmitting the driving force of the motor 15 from the screw-hole member 16b to the tube 12. When the tube 12 is moved in the extension direction D1, a static friction force or a dynamic friction force acts between the tube 12 and the inner circumferential surface 13b of the housing 13. These friction forces are exerted on the tube 12 as a sliding resistance to resist the movement of the tube 12. This sliding resistance acts, as a shear force in the retraction direction D2, on the tip portion 16ca of the coupling member 16c through the tube 12. Likewise, when the tube 12 is moved in the retraction direction D2, a static or dynamic friction force acting between the tube 12 and the housing 13 is exerted on the tube 12 as a sliding resistance. This sliding resistance acts, as a shear force in the extension direction D1, on the tip portion 16ca of the coupling member 16c through the tube 12. When a shear resistance of the coupling member 16c is greater than or equal to the sliding resistance exerted on the tube 12, the coupling member 16c remains undamaged without cracks or breaks. For this reason, the coupling member 16c is structured to have a shear resistance that is greater than or equal to the sliding resistance exerted on the tube 12.

Next, how the steering system 100 operates in the event of a secondary collision is described. Referring to FIGS. 1 and 4, when a vehicle equipped with the steering system 100 causes a collision with another object, such as another vehicle, the collision may cause a secondary collision between a driver and the steering wheel 2. When the secondary collision occurs, an impact force in the retraction direction D2 is applied to the steering shaft 11 through the steering wheel 2. The impact force acts to move the tube 12 in the retraction direction D2. As a result, the coupling member 16c of the driving force transmission device 16 receives a shear force in the retraction direction D2 from the tube 12.

Figure 5:
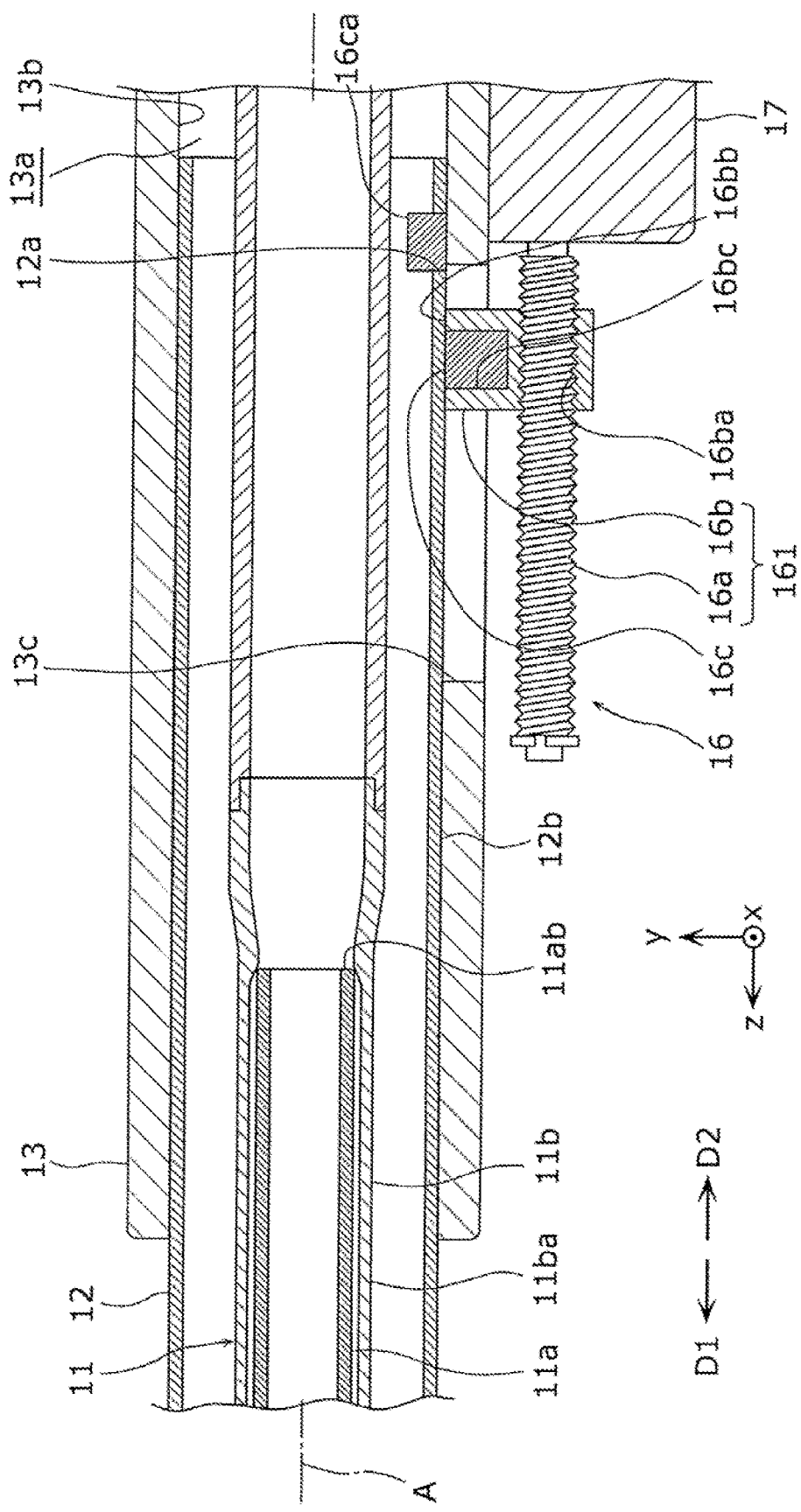
FIG. 5 is a diagram illustrating a condition of the driving force transmission device in FIG. 4 when a secondary collision occurs.

The coupling member 16c has a predetermined shear resistance that is less than the impact force. For example, the coupling member 16c is structured to have a strength that allows the coupling member 16c to be broken by a shear force in the extension direction D1 associated with the impact force. Thus, as illustrated in FIG. 5, the tip portion 16ca of the coupling member 16c is broken along the outer circumferential surface 12b of the tube 12 by the impact force, so that the tube 12 and the screw-hole member 16b are decoupled from each other. After that, the tube 12 still moves in the retraction direction D2 by the impact force. FIG. 5 is a diagram illustrating a condition of the driving force transmission device 16 in FIG. 4 when the secondary collision occurs. The coupling member 16c absorbs, when being broken, the impact force, i.e., energy of the impact force. Thus, the coupling member 16c is broken during the secondary collision, thereby absorbing the impact energy and allowing the tube 12 to move in a direction that retracts the steering shaft 11. This reduces an impact that a driver receives from the steering wheel 2.

As described above, according to the first embodiment, the steering system 100 is telescopically extendable and retractable using the driving force of the motor 15. The steering system 100 includes the motor 15, the telescopic steering shaft 11, the tube 12, and the driving force transmission device 16. The tube 12 is a supporting member that supports the steering shaft 11 such that the steering shaft 11 is rotatable and that is movable with telescopic movement of the steering shaft 11. The driving force transmission device 16 transmits the rotational driving force of the motor 15 to the tube 12. The driving force transmission device 16 includes the driving force converter 161 and the coupling member 16c. The driving force converter 161 converts the rotational driving force of the motor 15 to the linear driving force. The coupling member 16c couples the driving force converter 161 to the tube 12. The coupling member 16c is breakable by an impact force applied thereto through the steering shaft 11 and the tube 12 during the secondary collision so as to decouple the driving force converter 161 from the tube 12.

According to the above structure, the coupling member 16c is part of a structure that couples the driving force transmission device 16 to the tube 12 to transmit the driving force of the motor 15 to the tube 12. In the event of the secondary collision, the coupling member 16c is broken and thus decouples the driving force converter 161 from the tube 12, thereby allowing the tube 12 to move relative to the driving force transmission device 16. Further, the coupling member 16c absorbs, when being broken, the impact energy during the secondary collision. Thus, the coupling member 16c absorbs an impact exerted by a driver on the steering shaft 11 and the tube 12. That is, a structural element that serves to move the tube 12 to telescopically extend and retract the steering shaft 11 also serves to reduce the impact applied to the tube 12. This reduces the number of parts of a structure that moves the tube 12 and that reduces the impact applied to the tube 12, thus simplifying the structure. Thus, the steering system 100 has a simple structure for absorbing the impact during the secondary collision.

In the steering system 100 according to the first embodiment, the driving force converter 161 includes the threaded shaft 16a as a first member and a screw-hole member 16b as a second member. The threaded shaft 16a is rotated by the rotational driving force of the motor 15. The screw-hole member 16b is coupled to the tube 12. The screw-hole member 16b engages with the threaded shaft 16a such that the rotational movement of the threaded shaft 16a is converted to the linear movement of the screw-hole member 16b. For example, the screw-hole member 16b threadedly engages with the threaded shaft 16a. Thus, the driving force converter 161 uses two members to convert the rotational driving force of the motor 15 to the linear drive force. This simplifies the structure of the driving force converter 161.

In the steering system 100 according to the first embodiment, the coupling member 16c is part of the screw-hole member 16b. This structure allows the screw-hole member 16b to move together with the coupling member 16c, as a unit, so as to move the tube 12. Further, this structure reduces backlash between the screw-hole member 16b and the coupling member 16c, thus enabling smooth movement of the tube 12.

In the steering system 100 according to the first embodiment, the coupling member 16c is a resin member integrally molded with the driving force converter 161. For example, the coupling member 16c may be integrally molded with the screw-hole member 16b. Thus, the coupling member 16c and the driving force converter 161 are formed as an integrated, one-piece member. This leads to a reduction in the size of an assembly including the coupling member 16c and the driving force converter 161, for example, an assembly including the coupling member 16c and the screw-hole member 16b. This allows the threaded shaft 16a to be mounted closer to the tube 12 so as to reduce the size of the steering system 100.

Figure 6:
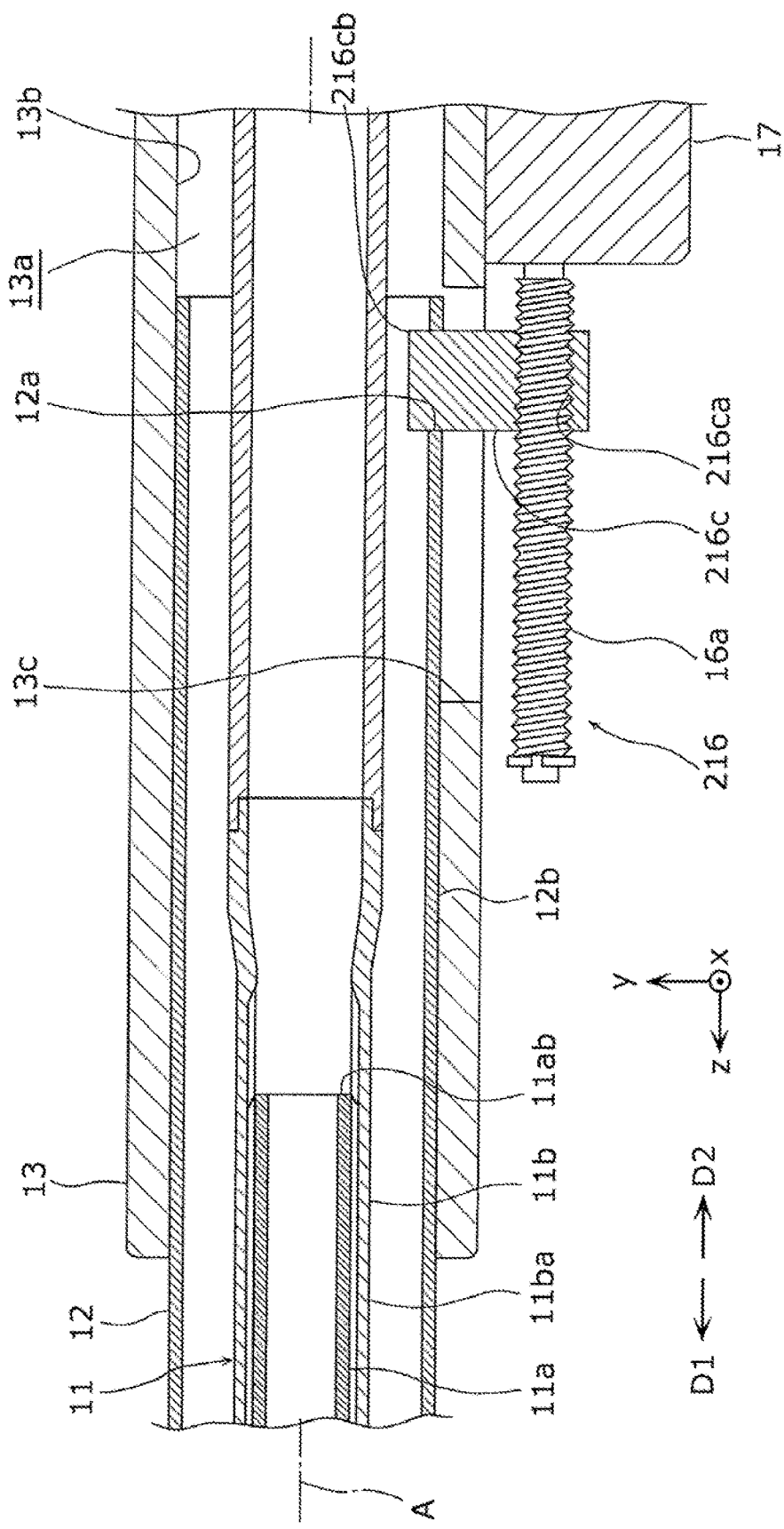
FIG. 6 is a schematic side cross-sectional view illustrating a steering system according to a second embodiment in the same manner as FIG. 4.

A steering system according to a second embodiment is described below. A difference of the second embodiment from the first embodiment is in the structure of a coupling member. In the description below, the difference is described in detail, and the same features as those in the first embodiment are not described again. FIG. 6 is a diagram illustrating the steering system according to the second embodiment in the same manner as FIG. 4.

As illustrated in FIG. 6, the steering system according to the second embodiment includes a driving force transmission device 216. The driving force transmission device 216 includes the threaded shaft 16a and a coupling member 216c that couples the threaded shaft 16a to the tube 12. The coupling member 216c has the same structure as a one-piece member that is made by unitarily forming the screw-hole member 16b and the coupling member 16c of the first embodiment from the same material as each other. The coupling member 216c includes the features of the screw-hole member 16b and the coupling member 16c of the first embodiment. Specifically, the coupling member 216c has an internally threaded hole 216ca that threadedly engages with the external thread of the threaded shaft 16a and that goes through the coupling member 216c. Further, the coupling member 216c has a tip portion 216cb extending toward the outer circumferential surface 12b of the tube 12. The tip portion 216cb is inserted and fitted in the engagement hole 12a of the tube 12. According to the second embodiment, the whole of the coupling member 216c including the tip portion 216cb has a uniform cross-sectional area taken along the xz-plane. Alternatively, the cross-sectional area of the tip portion 216cb may be smaller than the cross-sectional area of the other part of the coupling member 216c. The coupling member 216c is made of a material having less strength than that of the tube 12. The coupling member 216c may be made of the same material as the coupling member 16c of the first embodiment.

In the steering system according to the second embodiment, the rotational driving force of the motor 15 rotates the threaded shaft 16a in a first direction or a second direction opposite to the first direction. At this time, the coupling member 216c operates in the same manner as the screw-hole member 16b of the first embodiment, thus causing the tube 12 to move together with the coupling member 216c in the extension direction D1 or in the retraction direction D2. Accordingly, the steering shaft 11 extends or retracts. When the secondary collision occurs, the coupling member 216c operates in the same manner as the coupling member 16c of the first embodiment. At this time, the tip portion 216cb of the coupling member 216c receives a shear force from the tube 12 and is broken by the shear force. Thus, the steering system according to the second embodiment has the same advantageous effects as the steering system 100 according to the first embodiment. Further, the steering system according to the second embodiment has a simpler structure.

Figure 7:
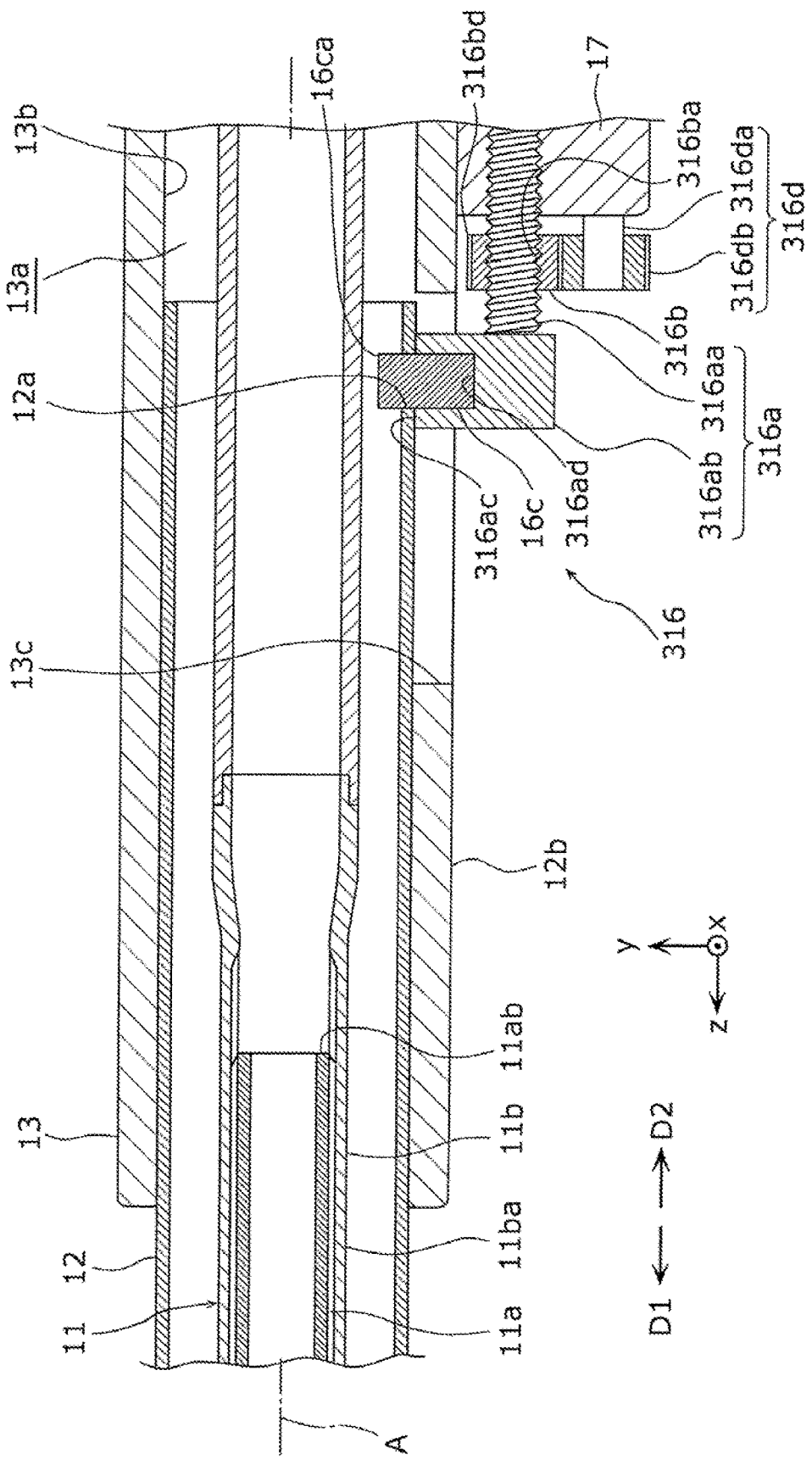
FIG. 7 is a schematic side cross-sectional view illustrating a steering system according to a third embodiment in the same manner as FIG. 4.

A steering system according to a third embodiment is described below. A difference of the third embodiment from the first embodiment is in the structure of a driving force transmission device. Specifically, a screw-hole member 316b is rotated by the motor 15, and a threaded shaft 316a is fixed and connected to the tube 12. In the description below, the difference is described in detail, and the same features as those in the preceding embodiments are not described again. FIG. 7 is a diagram illustrating the steering system according to the third embodiment in the same manner as FIG. 4.

As illustrated in FIG. 7, the steering system according to the third embodiment includes a driving force transmission device 316. The driving force transmission device 316 includes the threaded shaft 316a, the screw-hole member 316b, the coupling member 16c, and a rotating member 316d. The threaded shaft 316a has a threaded shank portion 316aa and a support portion 316ab. The shank portion 316aa has an outer circumferential surface provided with an external thread. The support portion 316ab supports the shank portion 316aa. According to the third embodiment, the shank portion 316aa is supported at its end by the support portion 316ab. Alternatively, the shank portion 316aa may be supported at any other position. The shank portion 316aa and the support portion 316ab are fixed together and thus are neither movable nor displaceable relative to each other. The shank portion 316aa and the support portion 316ab are provided by either one piece or separate pieces. As with the screw-hole member 16b of the first embodiment, the support portion 316ab has a surface 316ac that faces the outer circumferential surface 12b of the tube 12 and that has a recess 316ad in which the coupling member 16c is inserted and fitted.

The coupling member 16c is fitted in the recess 316ad of the support portion 316ab and is also fitted in the engagement hole 12a of the tube 12. Thus, the tube 12 and the threaded shaft 316a are coupled and fixed together. As with the threaded shaft 16a of the first embodiment, the shank portion 316aa of the threaded shaft 316a fixed to the tube 12 extends in the z-axis directions, i.e., in the directions D1 and D2. The threaded shaft 316a may be made of the same material as the threaded shaft 16a or the screw-hole member 16b of the first embodiment.

The screw-hole member 316b has an internally threaded hole 316ba that threadedly engages with the external thread of the shank portion 316aa and that goes through the screw-hole member 316b. The screw-hole member 316b threadedly engaging with the shank portion 316aa is rotatable about the axis of the thread, but is fixed in position and immovable relative to the housing 13 in the z-axis directions, i.e., in the directions D1 and D2. Thus, the rotation of the screw-hole member 316b causes the shank portion 316aa to reciprocate in the axial direction of the shank portion 316aa. An outer circumferential surface 316bd of the screw-hole member 316b about the internally threaded hole 316ba engages with the rotating member 316d such that a rotational driving force is transmittable therebetween. According to the third embodiment, the outer circumferential surface 316bd has gear teeth. Alternatively, the screw-hole member 316b may have any other structure that allows the screw-hole member 316b to be engaged with the rotating member 316d such that a rotational driving force is transmittable therebetween. The screw-hole member 316b may be made of the same material as the screw-hole member 16b of the first embodiment.

The rotating member 316d includes a rotating shaft 316da extending to the speed reducer 17, and an engagement portion 316db. The engagement portion 316db rotates as a unit with the rotating shaft 316da while engaging with the screw-hole member 316b. An outer circumferential surface of the engagement portion 316db about the rotating shaft 316da engages with the outer circumferential surface 316bd of the screw-hole member 316b such that a rotational driving force is transmittable therebetween. According to the third embodiment, the engagement portion 316db is a gear wheel with gear teeth formed in the outer circumferential surface. Alternatively, the engagement portion 316db may have any other structure that allows the engagement portion 316db to be engaged with the screw-hole member 316b such that a rotational driving force is transmittable therebetween. The rotational driving force of the motor 15 is transmitted through the speed reducer 17 to the rotating shaft 316da of the rotating member 316d, thus rotating the rotating shaft 316da together with the engagement portion 316db. Thus, the screw-hole member 316b engaging with, e.g., meshing with the screw-hole member 316b is rotated on the shank portion 316aa. The rotating shaft 316da and the engagement portion 316db of the rotating member 316d are made of any material with strength and stiffness that enable transmission of the rotational driving force of the motor 15 to the screw-hole member 316b.

In the steering system according to the third embodiment, the rotational driving force of the motor 15 rotates the screw-hole member 316b in a first direction or a second direction opposite to the first direction. When the screw-hole member 316b is rotated in the first direction, the shank portion 316aa of the threaded shaft 316a is moved in the extension direction D1. At this time, the shank portion 316aa moves the support portion 316ab, the coupling member 16c, and the tube 12 together with the shank portion 316aa in the extension direction D1. Accordingly, the steering shaft 11 extends. When the screw-hole member 316b is rotated in the second direction, the shank portion 316aa is moved in the retraction direction D2. At this time, the shank portion 316aa moves the support portion 316ab, the coupling member 16c, and the tube 12 together with the shank portion 316aa in the retraction direction D2. Accordingly, the steering shaft 11 retracts. In the event of the secondary collision, the tip portion 16ca of the coupling member 216c fitting in the engagement hole 12a receives a shear force in the retraction direction D2 from the tube 12 and is broken by the shear force.

Thus, the steering system according to the third embodiment has the same advantageous effects as the steering system 100 according to the first embodiment. As with the coupling member 216c of the second embodiment, the coupling member 16c of the third embodiment may be unitarily formed with the threaded shaft 316a from the same material so as to serve also as the threaded shaft 316a.

While a steering system according to some aspects of the invention has been described with reference to illustrative embodiments, the invention is not limited to the embodiments. It will be understood by those skilled in the art that various modifications and combinations of the embodiments are possible without departing from the scope of the invention.

Although the embodiments illustrate that the tube 12 of the steering system is cylindrical in shape, the tube 12 is not limited to a cylindrical shape. The tube 12 may have any shape in cross section. Examples of the cross-sectional shape of the tube 12 may include a polygonal shape, an elliptical shape, an elongated circular shape, and a circular or elliptical shape with a width across flats. Although the embodiments illustrate that the tube 12 has a cylindrical shape that covers the entire outer circumference of the steering shaft 11, the tube 12 may have any shape that covers part of the outer circumference of the steering shaft 11.

Although the embodiments illustrate that the driving force converter of the driving force transmission device includes the threaded shaft and the screw-hole member, the driving force converter is not limited to this structure. The driving force converter may have any structure sufficient to convert rotational movement to linear movement. For example, the driving force converter may include a rack gear and a pinion gear that mesh each other to form a rack and pinion structure. A ball screw may be used to reduce rolling resistance of a mesh between the threaded shaft and the screw-hole member.

A steering system according to the invention is useful as a motor-driven telescopic steering system.

The steering system according to the invention has a simple structure for absorbing impact energy during a vehicle collision.

What is claimed is:
1. A steering system that is telescopically extendable and retractable using a motor driving force, the steering system comprising:
 a motor;
 a telescopic steering shaft;

a supporting member that supports the steering shaft such that the steering shaft is rotatable, the supporting member being movable with telescopic movement of the steering shaft; and a driving force transmission device that is configured to transmit a rotational driving force of the motor to the supporting member, wherein:

the driving force transmission device includes a driving force converter that is configured to convert the rotational driving force of the motor to a linear driving force, and a coupling member that couples the driving force converter to one of the motor and the supporting member, the coupling member is configured to break by an impact force applied to the coupling member through the steering shaft and the supporting member during a secondary collision so as to decouple the driving force converter from the one of the motor and the supporting member, the driving force converter includes a first member that is rotatable by the rotational driving force of the motor, and a second member that is coupled to the supporting member, the coupling member being at least partially housed by the second member, the second member has a surface that is in contact with an outer circumferential surface of the supporting member, and is curved to follow the outer circumferential surface of the supporting member, and a tip portion of the coupling member is inserted and fitted in an engagement hole formed in the outer circumferential surface of the supporting member.

2. The steering system according to claim 1, wherein the coupling member is a resin member integrally molded with the driving force converter.

3. The steering system according to claim 1, wherein the coupling member is a resin member integrally molded with the second member of the driving force converter.

4. The steering system according to claim 1, wherein the coupling member is made of resin.

5. The steering system according to claim 1, wherein the coupling member is made of a material having less strength than a material of the supporting member or a material of the second member of the driving force converter.

6. The steering system according to claim 1, wherein the coupling member is molded to the second member of the driving force converter.

7. The steering system according to claim 1, wherein the coupling member is inserted and fitted in a recess formed in the surface of the second member.

8. The steering system according to claim 1, wherein
one of the first member and the second member is a threaded shaft, and
the other of the first member and the second member is a screw-hole member with a screw hole that threadedly engages with the threaded shaft.

9. The steering system according to claim 8, wherein
the coupling member is a resin member integrally molded with the second member of the driving force converter.

10. The steering system according to claim 1, wherein
the second member engages with the first member in a manner that converts rotational movement of the first member to linear movement of the second member.

11. The steering system according to claim 10, wherein
the coupling member is a resin member integrally molded with the driving force converter.

12. The steering system according to claim 10, wherein
one of the first member and the second member is a threaded shaft, and
the other of the first member and the second member is a screw-hole member with a screw hole that threadedly engages with the threaded shaft.

13. The steering system according to claim 12, wherein
the coupling member is a resin member integrally molded with the driving force converter.

* * * * *